US010406950B2

(12) United States Patent
Yang et al.

(10) Patent No.: US 10,406,950 B2
(45) Date of Patent: Sep. 10, 2019

(54) CONNECTOR FOR A CLIMATE CONTROLLED SUPPORT DEVICE (71) Applicant: GENTHERM AUTOMOTIVE SYSTEMS (CHINA) LTD., Langfang, Hebei (CN)

(72) Inventors: Haiming Yang, Langfang GuangYang (CN); Tong Yu, Langfang (CN)

(73) Assignee: Gentherm Automotive Systems (China) Ltd., Langfang Hebei (CN)

( * ) Notice: Subject to any disclaimer, the term of this patent is extended or adjusted under 35 U.S.C. 154(b) by 0 days.

(21) Appl. No.: 15/577,582

(22) PCT Filed: Jul. 21, 2015

(86) PCT No.: PCT/CN2015/084548
§ 371 (c)(1),
(2) Date: Nov. 28, 2017

(87) PCT Pub. No.: WO2017/011990
PCT Pub. Date: Jan. 26, 2017

(65) Prior Publication Data
US 2018/0134193 A1 May 17, 2018

(51) Int. Cl.
*B60N 2/56* (2006.01)
*F24F 13/00* (2006.01)
(Continued)

(52) U.S. Cl.
CPC ............ *B60N 2/5657* (2013.01); *A47C 7/744* (2013.01); *A47C 21/044* (2013.01);
(Continued)

(58) Field of Classification Search
CPC .... B60N 2/5657; B60N 2/5642; B60N 2/565; A47C 7/744; A47C 21/044; F24F 13/0604; F24F 13/00; B60H 1/00564
(Continued)

(56) References Cited

U.S. PATENT DOCUMENTS 1,928,822 A * 10/1933 Schmidt .................... F24H 3/00
126/307 A
2,030,205 A * 2/1936 Green ..................... F23L 17/02
126/307 A
(Continued)

FOREIGN PATENT DOCUMENTS

CN 1285288 A 2/2001
CN 201324040 Y 10/2009
(Continued)

OTHER PUBLICATIONS

International Search Report for International Application No. PCT/CN2015/084548, dated Apr. 21, 2016.
(Continued)

*Primary Examiner* — Milton Nelson, Jr.
(74) *Attorney, Agent, or Firm* — The Dobrusin Law Firm, P.C.

(57) ABSTRACT

Disclosed is a connector, comprising a base including one or more supports extending from the base, a diverter that is offset from the base via the one or more supports, and a passage defined in the base having a size that is substantially the same as a size of the diverter. The diverter is configured to extend through a layer in a climate control device. The diverter restricts the layer from obstructing the passage.

20 Claims, 4 Drawing Sheets

(51) Int. Cl.
 *F24F 13/06* (2006.01)
 *B60H 1/00* (2006.01)
 *A47C 7/74* (2006.01)
 *A47C 21/04* (2006.01)

(52) U.S. Cl.
 CPC ....... *B60H 1/00564* (2013.01); *B60N 2/5642* (2013.01); *F24F 13/00* (2013.01); *F24F 13/0604* (2013.01)

(58) Field of Classification Search
 USPC ........................................ 297/180.14, 180.13
 See application file for complete search history.

(56) References Cited

U.S. PATENT DOCUMENTS

| | | | | |
|---|---|---|---|---|
| 2,030,825 | A * | 2/1936 | Pembroke | F23L 17/02 126/307 A |
| 2,604,887 | A * | 7/1952 | Ziph | F23M 9/006 126/307 A |
| 2,612,945 | A * | 10/1952 | Granger | F23D 5/00 431/118 |
| 2,759,713 | A * | 8/1956 | Maniscalco, Sr. | F24F 6/025 261/119.1 |
| 4,189,180 | A | 2/1980 | Klein | |
| 4,509,792 | A * | 4/1985 | Wang | A47C 7/74 297/180.14 |
| 4,580,548 | A * | 4/1986 | Ono | F23M 9/006 126/307 A |
| 4,637,556 | A * | 1/1987 | Dunn | B02C 23/32 241/48 |
| 4,795,211 | A * | 1/1989 | Stern | A47C 7/62 248/311.2 |
| 5,626,386 | A | 5/1997 | Lush | |
| 6,189,966 | B1 | 2/2001 | Faust et al. | |
| 6,206,465 | B1 | 3/2001 | Faust et al. | |
| 6,224,150 | B1 | 5/2001 | Eksin et al. | |
| 6,277,023 | B1 | 8/2001 | Schwarz | |
| 6,291,803 | B1 | 9/2001 | Fourrey | |
| 6,481,801 | B1 | 11/2002 | Schmale | |
| 6,505,886 | B2 | 1/2003 | Gielda et al. | |
| 6,619,382 | B1 | 9/2003 | Ichigaya | |
| 6,626,488 | B2 | 9/2003 | Pfahler | |
| 6,805,627 | B2 * | 10/2004 | Marts | F24F 13/082 454/367 |
| 6,875,697 | B2 | 4/2005 | Trivedi | |
| 7,108,319 | B2 | 9/2006 | Hartwich et al. | |
| 7,287,812 | B2 | 10/2007 | Ishima et al. | |
| 7,322,643 | B2 | 1/2008 | Ishima et al. | |
| 7,370,911 | B2 * | 5/2008 | Bajic | B60N 2/5635 297/180.11 |
| 7,467,823 | B2 | 12/2008 | Hartwich | |
| 7,506,924 | B2 | 3/2009 | Bargheer et al. | |
| 7,527,329 | B2 | 5/2009 | Alacqua et al. | |
| 7,581,584 | B2 | 9/2009 | Yoneno et al. | |
| 7,607,739 | B2 | 10/2009 | Browne et al. | |
| 7,673,935 | B2 | 3/2010 | Nishide et al. | |
| 7,828,050 | B2 | 11/2010 | Esaki | |
| 7,857,395 | B2 | 12/2010 | Kikuchi et al. | |
| 7,862,113 | B2 * | 1/2011 | Knoll | B60N 2/5635 297/180.13 |
| 7,866,017 | B2 | 1/2011 | Knoll | |
| 8,129,013 | B2 | 3/2012 | Ichigaya | |
| 8,388,057 | B2 | 3/2013 | Barkow et al. | |
| 8,777,320 | B2 | 7/2014 | Stoll et al. | |
| 8,979,207 | B2 | 3/2015 | Bachar | |
| 8,998,311 | B2 * | 4/2015 | Axakov | B60N 2/5635 297/180.13 |
| 9,055,820 | B2 | 6/2015 | Axakov et al. | |
| 9,061,617 | B2 | 6/2015 | Axakov et al. | |
| 9,713,975 | B2 | 7/2017 | Berry et al. | |
| 9,731,639 | B2 | 8/2017 | Jung et al. | |
| 9,738,191 | B2 * | 8/2017 | Langensiepen | B60N 2/5678 |
| 9,839,861 | B1 * | 12/2017 | Ritz | A63H 37/00 |
| 2002/0003362 | A1 | 1/2002 | Kunkel et al. | |
| 2002/0067058 | A1 | 6/2002 | Pfahler | |
| 2003/0102699 | A1 | 6/2003 | Aoki et al. | |
| 2003/0214160 | A1 * | 11/2003 | Brennan | A47C 7/74 297/180.14 |
| 2004/0090093 | A1 | 5/2004 | Kamiya et al. | |
| 2005/0243331 | A1 | 11/2005 | Ishima et al. | |
| 2005/0264086 | A1 * | 12/2005 | Lofy | B60N 2/5628 297/452.42 |
| 2005/0285438 | A1 | 12/2005 | Ishima et al. | |
| 2006/0138812 | A1 | 6/2006 | Aoki | |
| 2007/0188007 | A1 | 8/2007 | Lazanja et al. | |
| 2007/0227163 | A1 | 10/2007 | Storrer et al. | |
| 2009/0066122 | A1 | 3/2009 | Minuth et al. | |
| 2010/0327636 | A1 | 12/2010 | Stoll et al. | |
| 2011/0109128 | A1 | 5/2011 | Axakov et al. | |
| 2011/0260509 | A1 | 10/2011 | Siu | |
| 2012/0144844 | A1 | 6/2012 | Park et al. | |
| 2012/0315132 | A1 | 12/2012 | Axakov et al. | |
| 2013/0088064 | A1 | 4/2013 | Axakov et al. | |
| 2013/0140857 | A1 | 6/2013 | Shin et al. | |
| 2013/0164123 | A1 | 6/2013 | Helnebstein | |
| 2015/0008716 | A1 | 1/2015 | Dry et al. | |
| 2015/0079892 | A1 | 3/2015 | Bauer et al. | |
| 2015/0151608 | A1 | 6/2015 | Efthymiou et al. | |
| 2015/0329027 | A1 | 11/2015 | Axakov | |
| 2016/0023580 | A1 | 1/2016 | Bauer | |
| 2016/0114709 | A1 | 4/2016 | Kim et al. | |
| 2017/0210258 | A1 | 7/2017 | Cheon | |
| 2018/0022252 | A1 | 1/2018 | Arata et al. | |
| 2018/0056834 | A1 | 3/2018 | Line et al. | |
| 2018/0065525 | A1 | 3/2018 | Higashihara | |
| 2018/0126880 | A1 | 5/2018 | Kim et al. | |
| 2018/0147961 | A1 | 5/2018 | Boquet et al. | |
| 2018/0147962 | A1 | 5/2018 | Longatte et al. | |

FOREIGN PATENT DOCUMENTS

| | | | | |
|---|---|---|---|---|
| CN | 203611811 U | 5/2014 | | |
| DE | 3304151 A1 * | 8/1984 | .......... | F24F 13/0604 |
| DE | 19941715 C1 | 11/2000 | | |
| DE | 19920062 C2 | 11/2003 | | |
| DE | 10010986 B4 | 7/2004 | | |
| DE | 102009024992 A1 | 12/2009 | | |
| DE | 102009009057 A1 | 6/2010 | | |
| DE | 102010005488 A1 | 10/2010 | | |
| DE | 102009024332 A1 | 12/2010 | | |
| DE | 102011122124 A1 | 7/2012 | | |
| DE | 202012010708 U1 | 11/2012 | | |
| DE | 102012011398 A1 | 12/2012 | | |
| DE | 202013006136 U1 | 7/2013 | | |
| DE | 102013218696 A1 | 3/2015 | | |
| EP | 1084875 A2 | 3/2001 | | |
| EP | 1222884 A1 | 7/2002 | | |
| EP | 1050429 B1 | 10/2005 | | |
| EP | 2423040 A2 | 2/2012 | | |
| GB | 664990 A * | 1/1952 | ............ | F04D 25/08 |
| JP | 57-142946 U | 9/1982 | | |
| JP | S58-147459 U | 10/1983 | | |
| JP | S58-171049 U | 11/1983 | | |
| JP | 58-185952 U | 12/1983 | | |
| JP | 60-150709 A | 8/1985 | | |
| JP | S63-52459 U | 4/1988 | | |
| JP | 2001-190358 A | 7/2001 | | |
| JP | 2004-82961 A | 3/2004 | | |
| JP | 2004-159671 A | 6/2004 | | |
| JP | 2005-143981 A | 6/2005 | | |
| JP | 2005-287538 A | 10/2005 | | |
| JP | 2007-97948 A | 4/2007 | | |
| JP | 2007-223352 A | 9/2007 | | |
| JP | 2007-236607 A | 9/2007 | | |
| JP | 2010-273 A | 1/2010 | | |
| JP | 4580672 B2 | 11/2010 | | |
| JP | 2011-57010 A | 3/2011 | | |
| JP | 2011-201506 A | 10/2011 | | |
| JP | 2012-85712 A | 5/2012 | | |
| JP | 2012-85724 A | 5/2012 | | |
| JP | 2012-197032 A | 10/2012 | | |
| JP | 2013-112291 A | 6/2013 | | |

(56) References Cited

FOREIGN PATENT DOCUMENTS

| | | | |
|---|---|---|---|
| JP | 2013-124000 A | 6/2013 | |
| JP | 5225823 B2 | 7/2013 | |
| JP | 5239172 B2 | 7/2013 | |
| JP | 5333081 B2 | 11/2013 | |
| JP | 5343503 B2 | 11/2013 | |
| JP | 5377895 B2 | 12/2013 | |
| JP | 5504027 B2 | 5/2014 | |
| KR | 10-2008-0048911 A | 6/2008 | |
| KR | 10-1180702 B1 | 9/2012 | |
| KR | 10-2013-0057037 A | 5/2013 | |
| KR | 20-2013-0007288 U | 12/2013 | |
| KR | 10-2014-0089301 A | 7/2014 | |
| KR | 10-1525766 B1 | 6/2015 | |
| KR | 101525766 B1 | 6/2015 | |
| KR | 101529090 B1 | 6/2015 | |
| KR | 101549826 B1 | 9/2015 | |
| KR | 10-2017-0064015 A | 6/2017 | |
| WO | WO-02053400 A2 * | 7/2002 | ......... B60H 1/00285 |
| WO | 2018/039472 A1 | 3/2018 | |
| WO | 2018-069337 A1 | 4/2018 | |

OTHER PUBLICATIONS

Written Opinion of the International Searching Authority for International Application No. PCT/CN2015/084548, dated Apr. 21, 2016.
Japanese Office Action for Japanese Application No. 2017-568127; dated Dec. 14, 2018.
Korean Office Action for Korean Patent Application No. 10-2017-7037889; dated Feb. 17, 2019.

* cited by examiner

CONNECTOR FOR A CLIMATE CONTROLLED SUPPORT DEVICE

FIELD

The present teachings relate generally to support devices, and more particularly to a connector for a climate controlled support device.

BACKGROUND

A support device can be any device that supports an occupant. For example, a support device can be a recliner, a chair, a couch, a bed, a seat, and/or the like. Support devices can be found virtually anywhere, such as in an automobile, a train, an airplane, and/or in a home or office. Recently, climate control devices have been added to various portions of support devices, such as a seating portion, a backrest portion, armrests, headrests, floor panels, side panels, etc., or a combination thereof. Climate control devices may enhance the comfort of an occupant using a support device by passing air towards the occupant; removing air from the vicinity of the occupant; or both. The air passed towards the occupant can be ambient air, warm air, cool air, or a combination thereof.

As can be imagined, attaching a climate control device to a support device can be desirable; however, once attached, some challenges exist in ensuring that the climate control device functions properly. For example, some climate control devices are designed to move air between an air mover and an air distribution structure. Typically, an air distribution structure comprises a spacer layer, a spacer layer attached to a cushion or portion of the support device, such as the seating portion; or a spacer layer attached to a cover layer, which together may form a bag structure. During use, air can be moved from the air mover to the spacer layer, the air distribution structure or both, which may require the flow path of the air to abruptly change directions. Abrupt changes in the flow path may undesirably cause backpressure in the system. Moreover, during use, when an occupant is seated in the seating portion, the weight of an occupant may cause the seating portion to compress and collapse onto the climate control device, which may undesirably block the passage or flow of air between the air mover and the air distribution structure. Moreover, securely attaching the air mover to the spacer layer, the air distribution structure, or both can be challenging, and maintaining a secure connection therebetween over the life of the support device can be especially challenging.

What is needed, therefore, is a connector that can address at least one of the aforementioned issues. For example, it would be attractive to have a connector that can prevent blockages in the passage or flow of air between the air mover and the spacer layer or the air distribution structure when a portion of the support device is compressed, such as by the weight of an occupant. It would be attractive to have a connector that can avoid abrupt changes in the direction of airflow from the air mover to the spacer layer or the air distribution structure. That is, it would be desirable to have a connector that can smoothly transition the flow of air therebetween to reduce turbulent airflow. It would be attractive to have a connector that can easily and securely connect an air mover to a spacer layer or an air distribution structure. It would be desirable to have a connector that can maintain a connection between an air mover and a spacer layer or an air distribution structure over the life of the climate control device, the support device, or both. It would be desirable to have a connector that is lightweight, can be manufactured relatively inexpensively, and can be easily installed.

SUMMARY

The present teachings are predicated upon providing an improved support device, and more particularly to a connector for a climate control device for a support device. The teachings herein provide a connector that can smoothly transition the flow of air between an air mover and a spacer layer, an air distribution structure, or both. The teachings provide a connector that can prevent blockages in the passage or flow of air between the air mover and the spacer layer or the air distribution structure when a portion of the support device is compressed, such as by the weight of an occupant for example. The connector can easily and securely connect an air mover to a spacer layer or an air distribution structure. The connector can maintain a connection between an air mover and a spacer layer or an air distribution structure over the life of the climate control device, the support device, or both. The connector is lightweight, can be manufactured relatively inexpensively, and can be easily installed.

The present teachings provide a connector. The connector may comprise a base including one or more supports extending from the base; a diverter that is offset from the base via the one or more supports; and a passage defined in the base having a size that is substantially the same as a size of the diverter. The diverter is configured to extend through a layer in a climate control device, such as a spacer layer or into a generally open structure such as an air distribution structure. The diverter can restrict the layer, the air distribution structure, or both from obstructing the passage. The diverter can also can smoothly transition the flow of air between an air mover and a spacer layer, the air distribution structure, or both so that abrupt changes in the direction of airflow therebetween are reduced or avoided.

The present teachings also provide a climate control device. The climate control device may comprise the connector according to the teachings herein and an air mover. The lower flange of the connector is configured to attach the air mover to the connector, and the diverter is configured to redirect air moving between the air mover and the layer.

The present teachings further provide a connector, comprising an upper flange including a diverter; a lower flange that is offset from the upper flange; and a passage extending between the upper flange an the lower flange. The passage has a size that is generally the same as the upper flange. The upper flange is configured to at least partially extend through a spacer layer or into an open area of air distribution structure. The lower flange is configured to attach to an air mover. The upper flange prevents the spacer layer, the cover layer, the air distribution structure, or a combination thereof from obstructing the passage. The diverter is configured to redirect a flow of air from the air mover about the spacer layer, into the air distribution structure, or both.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved support device. More particularly, the teachings herein provide a connector for a climate control device that is attached to a support device. The climate control device generally includes an air mover and an air distribution structure. The connector may connect the air mover to the air distribution structure. The air distribution structure may comprise a spacer layer; a spacer layer and an adjacent cushion located in any portion of the support device, such as the seating portion, the backrest portion, etc.; or the spacer layer and a cover layer, which together may form a bag structure. The connector includes an upper flange that may prevent the adjacent cushion, the spacer layer, the air distribution structure, and/or the cover layer from blocking a passage extending between the air mover and the spacer layer or the air distribution structure so that air can move unrestrictedly therebetween. The upper flange, a conically-shaped diverter, an area of impingement of the diverter, or a combination thereof may smoothly distribute or transition a direction of the flow of air from the air mover to the air distribution structure or the spacer layer. The connector may also provide a secure connection between the air mover and the air distribution structure or the spacer layer. The connection may be secure, yet removable, which may make service of the air mover, the climate control device, the support device, or a combination thereof practical.

The support device can be any device that supports an occupant. The support device may support the weight of an occupant. For example, the support device can be a recliner, a chair, a couch, a bed, a seat, etc. The support device can be located virtually anywhere. For example, the support device can be located in a vehicle, such as an automobile, a train, an airplane, etc.; at home or in an office; or a combination thereof. The support device may include one or more portions supporting an occupant. For example, the one or more portions may include a seating portion supporting the backside and legs of an occupant; a backrest portion supporting the back of an occupant; one or more armrests supporting the arms of an occupant; a headrest supporting the head and neck of an occupant; etc.; or a combination thereof. In some configurations, the one or more portions may include a cushion that may cooperate with the spacer layer to form the air distribution structure. In other configurations, the spacer layer may cooperate with a cover layer to form the air distribution structure, which may be a bag structure. One or more climate control devices may be connected or attached to, made integral with, and/or incorporated into the support device. Preferably, one or more portions of the support device, such as a seating portion, a backrest portion, arm rest(s), a headrest, etc. includes one or more climate control devices.

The support device may include one or more cushions. The one or more cushions may be located on any portion of the support device. For example, one or more cushions may be located on a seating portion; a backrest portion; one or more armrests; a headrest supporting; or a combination thereof. The one or more cushions may be one or more comfort layers disposed on a support structure. The one or more cushions may be at least partially compressible and/or at least partially form fitting. The one or more cushions may compress when an occupant is in contact with or is near the support device. The one or more cushions may be resilient and/or may include a memory material so that the cushion un-compresses and returns to its original state after the occupant is no longer in contact with, or near, the support device. The one or more cushions may be made of any suitable material, such as foam. The one or more cushions may be air permeable, air impermeable, or portions of the one or more cushions may be air permeable, air impermeable, or both. The one or more cushions may cooperate with the spacer layer to form the air distribution structure. More specifically, a bottom or backside of the one or more cushions may cooperate with the spacer layer to form the air distribution structure. The one or more cushions may include a spring core. The one or more cushions may be a unitary structure, or the one or more cushions may comprise a plurality of structures supported on a support structure. One or more climate control devices may be connected or attached to, or made integral with one or more cushions. The one or more climate control devices, or portions of the one or more climate control devices, such as a spacer layer, an air distribution structure, a duct, a duct connector, or a combination thereof can be attached to a bottom or side of the one or more cushions. The one or more cushions may include a slot, a recess, or any other opening or void for receiving one or more climate control devices, or portions of one or more climate control devices, such as a spacer layer, an air distribution structure, a duct, a duct connector, or a combination thereof.

The one or more climate control devices may function to improve comfort of an occupant in or near the support device. The one or more climate control devices may move a fluid, such as air, towards and/or away from an occupant in or near the support device. The air moved towards and/or away form an occupant may be warm air, cool air, ambient air, or a combination thereof. One or more climate control devices may be connected or attached to, made integral with, and/or incorporated into the support device, or one or more portions of the support device. The one or more climate control devices can include one or more air movers, one or more spacer layers, one or more air distribution structures having one or more spacer layers, one or more connectors, and/or any combination thereof.

The one or more air movers can be any device that moves a fluid, create a flow of fluid, or both. The fluid may be air, or the fluid may be air including water (i.e., a mist). More specifically, the one or more air movers may be any device (s) that directs, passes, provides, moves, pushes, and and/or pulls air. The one or more air movers may pass air towards an occupant in or in the vicinity of the support device (push mode). The one or more air movers may pull air away an occupant in or in the vicinity of the support device (pull mode). The air passed towards or away form the occupant may be ambient air, cool air, warm air, or a combination thereof. That is, the one or more air moves may pass air over a heating appliance to provide warm air towards the occupant. The heating applicants may be any suitable device that can warm the air passing there over and/or passing thereby. The one or more air moves may pass air over a cooling appliance to provide cool air towards the occupant. The cooling appliance may be any suitable device that cools the air passing there over or passing thereby. The one or more air movers may be, or may include, one or more fans or blowers. For example, the one or more air movers may be or may include one or more axial fans, radial fans, centrifugal fans, cross-flow fans, etc. Preferably, the one or more air movers include one or more radial fans. The one or more air movers may operate in a single speed, or the one or more fans may have multi-speeds; that is, the one or more air movers may have at least a low, medium, and high setting for moving air.

The one or more air movers can operate in a push mode. In a push mode, the one or more air movers can draw in air from the atmosphere surrounding the support device. The pushed air may be ambient air, cool air, or warm air. The one or more air movers may move or push the air from the air mover, through the passage in the connector and through or along the spacer layer and/or the air distribution structure towards the occupant in or near the support device.

The one or more climate control devices can operate in a pull mode. The pull mode may operate generally opposite the push mode. In the pull mode, the one or more air movers can draw in air from or near the support device. The drawn-in air may be ambient air, cool air, or warm air. In the pull mode, the air mover may pull or suck-in air through the support layer, through the passage in the connector, and direct the air towards the air mover. In the pull mode, the air mover may pull or suck-in air through the upper openings in the cover layer, through the air distribution structure, through or along the support layer, through the passage in the connector, and move the towards the air mover, or any combination thereof.

The one or more spacer layers may function to move or distribute a flow of air. The one or more spacer layers may function to create an open area so that air can be moved between an occupant and one or more air movers, or vice versa. That is, the one or more spacer layers may provide for the air to move laterally there along when the system is operating in a push mode, a pull mode, or both. For example, the one or more spacer layers may provide for the air to move laterally along the spacer layer, within the air distribution system, or both as the air flows from the air mover to the one or more upper openings in the cover layer, the cushion, or both towards the vicinity of the occupant (push mode). Additionally, or alternatively, one or more spacer layers may provide for the air to move laterally along the spacer layer, within the air distribution system, or both as the air flows from the vicinity of the occupant to the one or more air movers (pull mode). The one or more spacer layers may direct fluid to, from, or both a specific region. The one or more spacer layers may be sealed with a forward layer and a rearward layer. The one or more spacer layers may be open to ambient. The air from the one or more spacer layers may be directed by the regions of a support structure surrounding the spacer layers. The one or more spacer layers may be a comfort layer supporting an occupant or load in the support device. The one or more spacer layers may be form fitting and/or may at least partially deflect or compress when an occupant is in the support device. The one or more spacer layers may prevent crushing of the one or more air movers when an occupant or load is in or near the support device. The one or more spacer layers may prevent deflection of the support device, a cushion or portion of the support device, or a combination thereof so that a flow of air between the support device and the air mover is neither restricted nor blocked. The one or more spacer layers may be received in a cavity, recess, or opening in the support device, a portion of the support device (i.e., a seating portion) or in a cushion. The one or more spacer layers may be attached to a bottom (i.e., a B-side) or side of the support device, a cushion, a portion of the support device, or a combination thereof to form an air distribution system. The cushion or foam may seal along a top, along the sides, or both of the spacer layer to form the air distribution system. The one or more spacer layers may be attached to a cover layer to form an air distribution system, which may be a bag structure. The one or more spacer layers may include a base or a carrier having one or more spacers, one or more lower flange openings, or both. The one or more spacer layers, the carrier layer, or both may be made from a material sold under the trade name 3MESH® and is commercially available from Mueller Textil GmbH, Germany or Mueller Textiles, Inc., R.I.

The one or more spacer layers may include one or more spacers located on the carrier. The one or more spacers may function to create one or more fluid channels. Preferably, the one or more spacers form a plurality of fluid channels that are connected together forming an open area. The one or more spacers may support an air permeable free-space within a cushion, in the air distribution structure or both. The one or more spacers may function to help prevent crushing of the one or more air movers under the weight of an occupant in the support device. The one or more spacers may help prevent deflection of the support device, a cushion or portion of the support device, the cover layer, the air distribution structure, or a combination thereof so that a flow of air between the support device and the air mover is not restricted or blocked, and remains unobstructed. The one or more spacers may help direct air flow through the spacer layer, the air distribution structure, or both. The one or more spacers may create a passageway for fluid to flow to the one or more of the portions of the support device. The one or more spacers may direct or guide air between the air mover and the spacer layer, the air distribution structure, or both. The one or more spacers may be three-dimensional projections that resist deformation, crushing, or both. The one or more spacers may be rigid and/or may deflect at least partially when an occupant or load is provided on the support device. The one or more spacers may be one or more extruded parts, such as foam material, flat blocks, stamped blocks or fabric, cone-shaped castings, molded parts, nubs made of foil, or a combination thereof. The one or more spacers may be made form an elastic, flexible, soft, springy and/or supporting material, such as rubber, silicon, foam, cellulose, textiles, paper, and the like. The one or more spacers may be generally of the same height, or the height may vary to comfortably support an occupant. Preferably, the one or more spacers are arranged on the carrier flush to each other in one or several rows. The one or more spacers may be arranged on the carrier adjacent each other. If at least a part of the spacers are arranged on the carrier immediately next to each other without any free space, it will create greater softness than a one-piece spacer, for example. The one or more spacers can have any suitable shape. For example, the one or more spacers may be conical, round, mushroom head-like, elongated, cylindrical, ring-shaped or cuboid shaped, round, and/or zig-zag-shaped. The one or more spacers may be similar to the spacers disclosed in commonly-owned U.S. Pat. No. 8,777,320 B2, which is hereby incorporated by reference in its entirety for all purposes.

The one or more spacer layers or carriers may include one or more flange openings. The one or more flange openings may be any opening or passage in the carrier that may function to receive at least a portion of the one or more connectors, the one or more upper flange, the one or more diverters, or a combination thereof. The one or more flange openings may provide a passageway so that air can move between the one or more air movers and the occupant, the support device, the one or more air distribution structures, the one or more spacer layers, or a combination thereof. The one or more flange openings may be any opening (i.e., slit, aperture, opening, rip, hole, passage, void, etc.) in the carrier. The one or more flange openings may be located anywhere on the carrier.

The one or more spacer layers may include one or more boss openings and one or more alignment openings in the carrier. The boss openings may receive a corresponding boss of the connector. The one or more boss openings may cooperate with the corresponding bosses to form a connection between the spacer layer, the air distribution structure, or both and the connector, the air mover, or both. The one or more boss openings may cooperate with the corresponding bosses of the one or more connectors to align the one or more connectors and the one or more air movers with the one or more spacer layers, air distribution structures, or both. The one or more boss openings may cooperate with the corresponding bosses of the one or more connectors to form a poka yoke feature so that the one or more connectors and the one or more air movers can be attached to the one or more spacer layers, air distribution structures, or both in only a single general orientation. The one or more boss openings may be any suitable shape and size for receiving the one or more bosses. For example, the one or more boss openings can be elliptical, square, triangular, star, symmetrical, asymmetrical, pentagonal, octagonal, etc. Preferably, the one or more boss openings are round. Preferably, the one or more boss openings are sized so that an interference fit is created with the corresponding one or more bosses.

The one or more alignment openings may function to receive a corresponding one or more alignment posts of the connector for attaching the one or more connectors, the one or more air movers, or both to the one or more spacer layers, the one or more air distribution structures, or both. The one or more alignment openings in the carrier may cooperate with the alignment posts to align the one or more connectors and the one or more air movers with the one or more spacer layers, air distribution structures, or both. The one or more alignment openings may cooperate with the corresponding alignment posts of the one or more connectors to form a poka yoke feature so that the one or more connectors and the one or more air movers can be attached to the one or more spacer layers, air distribution structures, or both in only a single general orientation. The one or more alignment openings may be any suitable shape that generally corresponds to the shape of the corresponding alignment posts. For example, the one or more alignment openings can be elliptical, square, triangular, star, symmetrical, asymmetrical, pentagonal, octagonal, etc. Preferably, the one or more alignment openings are generally round. Preferably, the one or more alignment openings are sized so that an interference fit is created with the corresponding one or more alignment posts.

Some climate control devices may include one or more cover layers disposed on the one or more spacer layers to form the air distribution structure, which may also be a bag structure. The one or more cover layers and the one or more spacer layers may be sealed at their edges to form an air impermeable air distribution structure or bag structure. The one or more cover layers and the one or more spacer layers may be sealed via any suitable method or fastener. For example, the layers can be sealed together using an adhesive, sewing, staples, an air impermeable zipper, the like, or a combination thereof. Preferably, the layers are sealed at their periphery via IR, RF or ultrasonic welding methods. Preferably, the cover layer is air impermeable and includes one or more upper openings. The air distribution structure or bag structure may include an open space between the layers.

The air distribution structure may function to provide a sealed or substantially sealed structure for transferring and/or moving air between the air mover and the occupant or vice versa. The air distribution structure may receive air supplied by the air mover (push mode) and, via the one or more upper openings in the cover layer, or via an air permeable cushion, may distribute the air to the support device, one or more portions of the support device, or a combination thereof. Via one or more upper openings, or an air permeable cushion, the air distribution structure may help remove or gather air from the support device, an area in the vicinity of the support device, the one or more portions of the support device, a cushion, or a combination thereof to the air mover (pull mode). Through the one or more flange openings in the spacer layer, the connector, the upper flange and/or diverter may extend into an open space defined in the air distribution structure between the spacer layer and the cover layer, or between the spacer layer and the cushion. The one or more upper openings may be in any suitable location on the one or more cover layers. The air distribution structure may be received in a cavity, recess, or opening in the support device, a portion of the support device (i.e., a seating portion), or in a cushion if the air distribution structure comprises a support layer and cover layer. In an air distribution system comprising a cover layer, the cover layer may be attached to a bottom or side of the support device, a portion of the support device (i.e., a seating portion), a cushion, or a combination thereof.

The one or more air movers may be attached to one or more spacer layers, the one or more air distribution structures, or both via one or more connectors. The one or more connectors may function to securely attach the one or more air movers to the one or more spacer layers, the one or more air distribution structures, or both. The one or more connectors may function to removably attach the one or more air movers to the one or more spacer layers, the one or more air distribution structures, or both. The one or more connectors may function to redirect a flow of air from the one or more air movers about the one or more spacer layers, into and about one or more air distribution structures, or both. The one or more connectors may function to prevent obstruction of a flow of air between the one or more air movers and the one or more spacer layers, the one or more air distribution structures, or both. That is, the one or more connectors may function to prevent blocking of an air stream extending between the air mover and the one or more spacer layers, the one or more air distribution structures, or both. For example, when the weight of an occupant presses onto a portion of the support device, such as the seating portion, the one or more connectors may restrict or prevent the seating portion, the spacer layer, the cushion, the air distribution structure, or a combination thereof from moving and blocking a flow of air between the one or more air movers and the one or more spacer layers, the one or more air distribution structures, or both.

The one or more connectors may be any device that may perform one or more of the aforementioned connector functions. The one or more connectors may include a base. The base may support one or more features of the connector. The base may be fabricated from any suitable material, such as plastic. The base, one or more features of the connector, or both may be fabricated via any suitable method. For example, the base, the one or more features of the connector, or a combination hereof may be cast, injection molded, vacuum formed, 3D printed, blow molded, etc.

The base may include a tab that may help attach the connector to the one or more spacer layers, the bag structure, or both. The tab may function to assist in removal of the connector from the one or more spacer layers, bag structures, or both to facilitate service of any components of the climate control device, the support device, or a combination thereof. The tab may function to assist in the manufacturing of the connector. For example, the tab may be a location where a gate is located if the connector is fabricated via an injection molding process.

The base may include a passage that extends though a thickness thereof. The passage may function to provide a passageway for air to move between the one or more air movers and the one or more spacer layers, air distribution structures, support devices, or a combination thereof. The passage may be located is any suitable location on the base. Preferably, the passage is located in a center region of the base.

The base may include a one or more vibration isolators. The one or more vibration isolators may function to dampen vibrations causes by the one or more air movers. The one or more vibration isolators may function to ensure a desired clamping force is established between the connector and the spacer layer, the air distribution structure, or both. The one or more vibration isolators may be any suitable device or structure that may perform one or more of the aforementioned functions. The one or more vibration isolators may be disposed on an upper surface of the base, the lower surface of the base, or both. Preferably, the one or more vibration isolators comprise a first vibration isolator and a second vibration isolator. One of the vibration isolators (i.e., the first vibration isolator) may be located along the entire upper surface of the base. Preferably, one of the vibration isolators is located or sandwiched in a space between the upper surface of the base and the carrier of the spacer layer, air distribution structure, or both. The first vibration isolator can be located on one side of the upper flange, or preferably on both sides of the upper flange. The other vibration isolator (i.e., the second vibration isolator) may be located along the lower surface of the base. The other vibration isolator may be located along the entire lower surface of the base, or, preferably, may be located at least partially along the lower surface in a space between the lower surface and a housing of the air mover. The first and second vibration isolators may be the same, or different. For example, the first and second vibration isolators may be fabricated from the same or different materials, and/or from materials having the same or different compression and vibration dampening properties. The thickness (i.e., cross-section) of the vibration isolators may be the same or different depending on the amount of space between the base surfaces and surfaces or portions with which the base contacts. One or more of the vibration isolators may be a skin of material disposed along the corresponding base surface. As used herein, the upper surface may face a bottom surface of the spacer layer, the carrier, the air distribution structure, or a combination thereof. The lower surface may face the housing of the air mover. The one or more vibration isolators may be fabricated from any suitable material. For example, the vibration isolator may comprise foam, rubber, plastic, etc. The one or more vibration isolators may be one or more pegs, posts, numbs, dimples, offsets, etc. that may take up space between the connector and the spacer layer, the air distribution structure, the air mover, or a combination thereof. Preferably, the one or more vibration isolators are at least partially compressible.

The one or more connectors may include an upper flange. The upper flange may function to extend through the flange opening in the spacer layer, into the open space in the air distribution structure, or both. The upper flange may function to prevent blockage of the passage in the base when the spacer layer, the cover layer, the air distribution structure, the cushion, the support device, or a combination thereof moves, flexes and/or compresses under the weight of an occupant or load on the support device. The upper flange may be any device or feature that may function to perform one or more of the aforementioned functions. The upper flange may be offset or elevated from the base. Preferably, the upper flange may be offset from the base via one or more supports. The upper flange may be offset from the base any suitable distance. For example, the upper flange may be offset from the base a distance that is not greater than a height of the one or more spacers, a height of the open space between the one or more spacer layers and the one or more cover layers, or a combination thereof. The height of the upper flange from the base may be about 5 mm or more, about 8 mm or more, about 9 mm or more, or about 9.5 mm or more. The height of upper flange from the base may be about 20 mm or less, about 15 mm or less, about 13 mm or less, or about 12.5 mm or less. Preferably, the height of the upper flange from the base is about 10 mm or about 12 mm.

The upper flange may include a diverter. The upper flange, the diverter, or both may function prevent the passage in the base from being obstructed or blocked when the spacer layer, the cover layer, the air distribution structure, the cushion, the support device, or any other layer or device, or any combination thereof, flexes and/or compresses under the weight of an occupant or load in or on the support device. The upper flange, the diverter, or both may function to deflect or redirect the direction of air flow from the one or more air movers to the spacer layer, within the air distribution structure, or both. In other words, the upper flange, the diverter, or both may function to change and/or transition the flow of air that enters the connector. That is, the flow of air may enter the passage along a path that is substantially along a longitudinal axis of the passage, and the upper flange, the diverter, or both may change the direction of the flow path to be substantially along an axis that is generally perpendicular to the axis of the passage. Stated another way, the upper flange, the diverter, or both may function to reduce backpressure that may be caused by air flowing from the air mover and then being abruptly redirected to flow along the spacer layer, within the air distribution structure, or both. The air may be abruptly redirected when the air encounters a flat wall that may be a bottom surface of the cushion, a bottom or inner surface of the cover layer, or the like. The diverter may be any device or feature that may function to perform one or more of the aforementioned functions. The diverter may have any suitable shape. For example, the diverter may be round, square, trapezoidal, irregular, symmetrical, asymmetrical, etc. Preferably, the diverter has a conical shape. The conically shaped diverter may include a tip or peak that is generally aligned with a center axis of the passage. The conically shaped diverter may function to more efficiently and evenly deflect or redirect a flow of air from the one or more air movers about the spacer layer, within the bag structure, or both. In various embodiments, the diverter can provide an area of impingement that increases in the direction of airflow. The area of impingement may increase from an initial relatively small area at the tip or peak of the diverter to a larger area away from the tip or peak, such as at a base of the connector. The increased area of impingement may function to help reduce turbulent airflow when the air flow changes directions when moving from the air mover to the spacer layer, the air distribution structure, or both. In some configurations, the area of impingement may also be substantially flat. In this regard, the area of impingement may be substantially perpendicular to the longitudinal axis extending through the passage, and/or to a surface of the upper flange. In other words, the area of impingement, the diverter, or both may be a flat plate-like structure, rather than conically shaped. The conically shaped diverter deflector may improve manufacturability of the connector. The diverter may extend through the flange opening in the spacer layer, into the open space in the air distribution structure, or both. The diverter may be offset or elevated from the base. The diverter may be offset from the base any suitable distance. For example, the diverter may be offset from the base a distance that is not greater than a height of the one or more spacers, a height of the open space between the one or more spacer layers and the one or more cover layers, or a combination thereof. The height of the diverter from the base may be about 5 mm or more, about 8 mm or more, about 9 mm or more, or about 9.5 mm or more. The height of diverter from the base may be about 20 mm or less, about 15 mm or less, about 13 mm or less, or about 12.5 mm or less. Preferably, the height of the diverter from the base is about 10 mm or about 12 mm. The diverter may be offset from the base via one or more supports.

The upper flange, the deflector, or both may be offset from the base via one or more supports. The one or more supports may support the upper flange, the diverter, or both. The one or more supports, the upper flange, the diverter, or a combination thereof may form a dome-like shape extending from the base. The one or more supports may assist in deflecting and/or redirecting air flow between the one or more air movers and the spacer layer, the air distribution structure, or both. The one or more supports may extend generally upward from the base relative to the lower flange. The one or more supports may be any suitable shape. For example, the one or more supports may be angled, rounded, curved, irregular, symmetrical, asymmetrical, etc. Preferably, the one or more supports are generally linear. The one or more supports may extend from the base in a generally perpendicular direction relative to an upper surface of the base. The one or more supports may extend generally parallel to a center axis extending through the passage in the base of the connector.

The one or more connectors may include one or more bosses. The one or more bosses may function to attach the one or more connectors, air movers, or both to the one or more spacer layers, air distribution structures, or both. The one or more bosses may function to removeably attach the one or more connectors, air movers, or both to the one or more spacer layers, air distribution structures, or both. The one or more bosses may cooperate with the bosses openings to align the one or more connectors and the one or more air movers with the one or more spacer layers, air distribution structures, or both. The one or more bosses may cooperate with the corresponding boss openings to form a poka yoke so that the one or more connectors, air movers, or both can be attached to the one or more spacer layers, air distribution structures, or both in only a single general orientation. The one or more bosses may be any suitable feature(s) that may function to perform one or more of the aforementioned functions. The one or more bosses may have any suitable shape that generally corresponds to the shape of the corresponding boss openings. For example, the one or more bosses can be elliptical, square, triangular, star, symmetrical, asymmetrical, pentagonal, octagonal, etc. Preferably, the one or more bosses are generally round. Preferably, the one or more bosses are sized so that an interference fit is created with the corresponding one or more boss openings. The one or more bosses may include one or more barbs, prongs, fingers, etc. that may function to lock or secure the one or more connectors to the one or more spacer layers, bag structures, or both. The one or more barbs may be offset from an upper surface of the base a sufficient distance so that a material thickness of the spacer layer fits between the prongs and the base.

The one or more connectors may include one or more alignment posts. The one or more alignment posts may function to attach the one or more connectors to the one or more spacer layers, air distribution structures, or both. The one or more alignment posts may function to removeably attach the one or more connectors to the one or more spacer layers, air distribution structures, or both. The one or more alignment posts may cooperate with the alignment openings to align the one or more connectors and the one or more air movers with the one or more spacer layers, air distribution structures, or both. The one or more alignment posts may cooperate with the corresponding alignment openings to form a poka yoke so that the one or more connectors can be attached to the one or more spacer layers, air distribution structure, or both in only a single general orientation. The one or more alignment posts may have any suitable shape that generally corresponds to the shape of the corresponding alignment openings. For example, the one or more alignment posts can be elliptical, square, triangular, star, symmetrical, asymmetrical, pentagonal, octagonal, etc. Preferably, the one or more alignment posts are generally round. Preferably, the one or more alignment posts are sized so that an interference fit is created with the corresponding one or more alignment openings.

The one or more connectors may include a lower flange. The lower flange may function to connect the air mover to the connector. The lower flange may function to securely, and/or removeably attach the air mover to the connector. The lower flange may function to align the one or more air movers with the one or more passages, the one or more spacer layers, the bag structure, the occupant or load in a support device, or a combination thereof. The lower flange may be generally aligned with the passage in the base, the upper flange, the diverter, or a combination thereof so that air moving between the air mover and the spacer layer, the air distribution structure, or both is not obstructed. The one or more passages may be substantially the same size as the diverter. That is, a cross section of the passage may be substantially the same as a cross section of the diverter.

The lower flange may include one or more fingers. The fingers may function to attach to an opening of the air mover. One or more of the fingers may be locking fingers. The one or more locking fingers may function to securely attach the air mover to the connector. The fingers, the locking fingers or both may be biased so that the fingers can engage the opening of the air mover with an interference fit.

Figure 1:
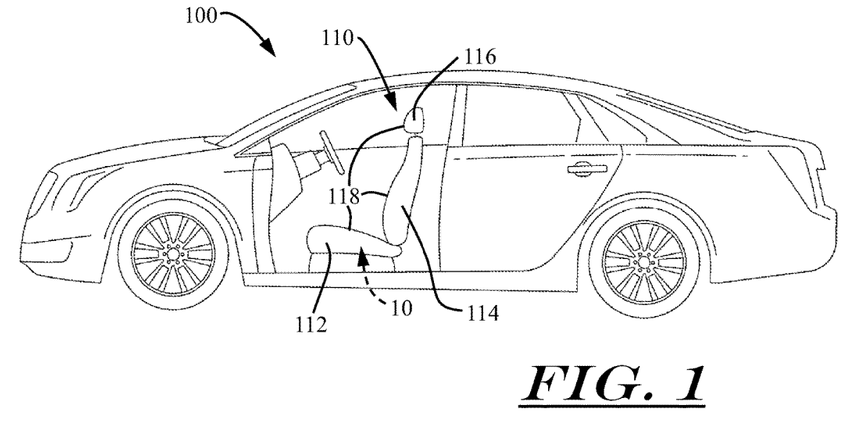
FIG. 1 is a side view of a vehicle having a support device including a climate control device according to the teachings herein.

In some configurations, the connector may include the upper flange, the diverter, the lower flange, and the vibration isolators. That is, in some configurations, the connector may include the features described above, except for the base. In these configurations, the upper flange may perform one or more of the aforementioned upper flange functions; the diverter may perform one or more of the aforementioned diverter functions; the lower flange may perform one or more of the aforementioned lower flange functions; and the one or more vibration isolators may perform one or more of the aforementioned vibration isolator functions, FIG. 1 is a side view of a vehicle 100. The vehicle 100 includes a support device 110. The support device 110 comprises a seating portion 112, a backrest portion 114, and a headrest 116. One or more of the seating portion 112, the backrest portion 114, and the headrest 116 includes a cushion 118 and a climate control device 10.

Figure 2:
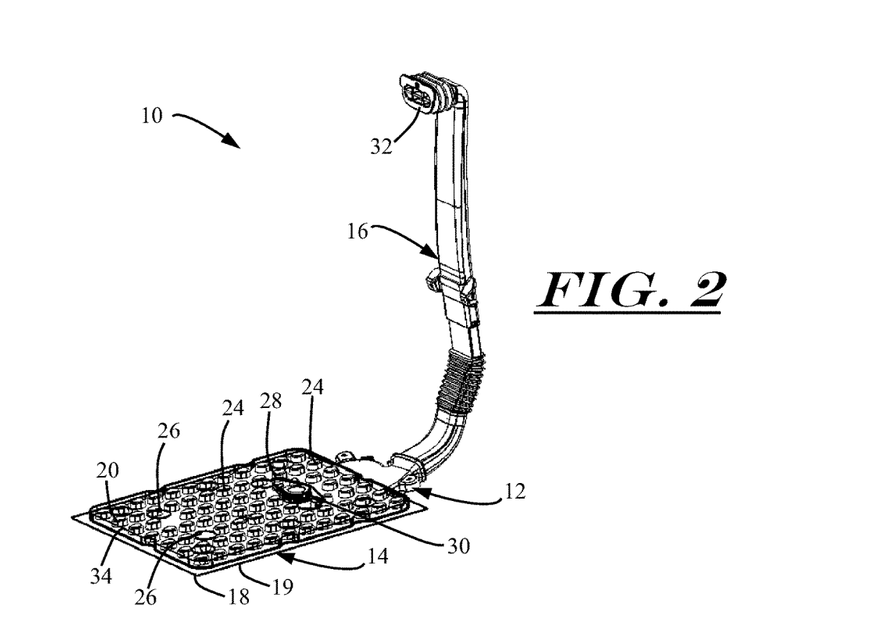
FIG. 2 is a perspective view of a climate control device according to the teachings herein.

FIG. 2 is a perspective view of a climate control device 10. The climate control device 10 includes an air mover 12 in communication with an air distribution structure 14, which may be a bag structure, and a duct 16. The air distribution structure 14 includes an open space 34 defined between a spacer layer 18 and a cover layer 20. The spacer layer 18 includes a flat or contoured sheet or carrier 19, a flange opening 22 (not shown) in the carrier 19, and a plurality of spacers 24 arranged on the carrier 19. The cover layer 20 includes one or more upper openings 26. A connector 28 is located between the spacer layer 18 and the air mover 12. The connector 28 includes an upper flange 30 extending into the open space 34 through the flange opening 22 in the spacer layer 18. The connector 28 also includes a lower flange 44 (not shown) in communication with an opening on the air mover 12. The air distribution structure 14 can be attached to any portion of the support device 110, such as the seating portion 112, for example. The duct 16 is in communication with another opening of the air mover 12, and can be attached to any portion of the support device 110, such as the backrest portion 114. The duct 16 includes a duct connector 32 for connecting the climate control device 10 to any portion of a support device 110, such as the headrest 116.

Figure 3:
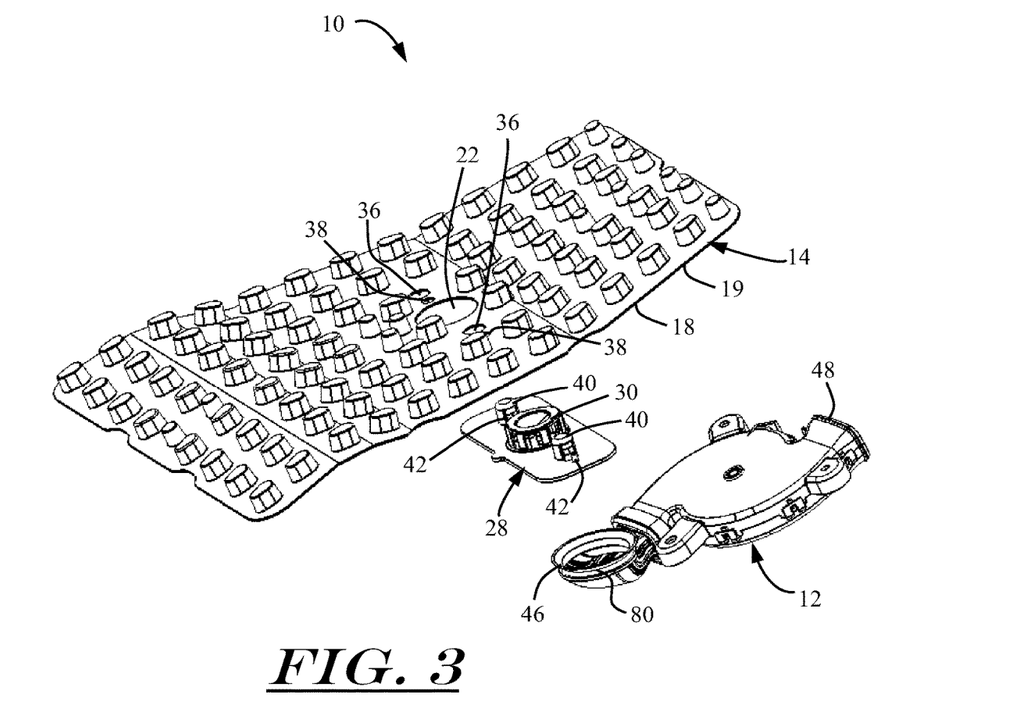
FIG. 3 is an exploded perspective view of a climate control device according to the teachings herein.

FIG. 3 is a perspective view climate control device 10. The climate control device 10 includes an air mover 12 in communication with a spacer layer 18. The spacer layer 18 may be an air distribution structure 14. Or, the spacer layer 18 can be attached to any portion of an occupant support device 110, such as a cushion 118 (FIG. 1) of the seating portion 112 to form an air distribution structure 14. The air mover 12 includes a housing 80. The spacer layer 18 includes a carrier 19 having a flange opening 22, a pair of boss openings 36, and a pair of alignment openings 38. A connector 28 is disposed between the spacer layer 18 and the air mover 12. The connector 28 includes an upper flange 30 that is configured to extend through the flange opening 22 and into an open space defined between the spacer layer 14 and the cushion 118. The connector 28 also includes a pair of bosses 40 configured to extend through the corresponding boss openings 36; a pair of alignment posts 42 configured to extend through the corresponding alignment openings 38; and a lower flange 44 (not shown) in communication with an opening 46 of the air mover 12. Another opening 48 of the air mover 12 can be in communication with a duct (See FIG. 1) or the surrounding atmosphere.

Figure 4A:
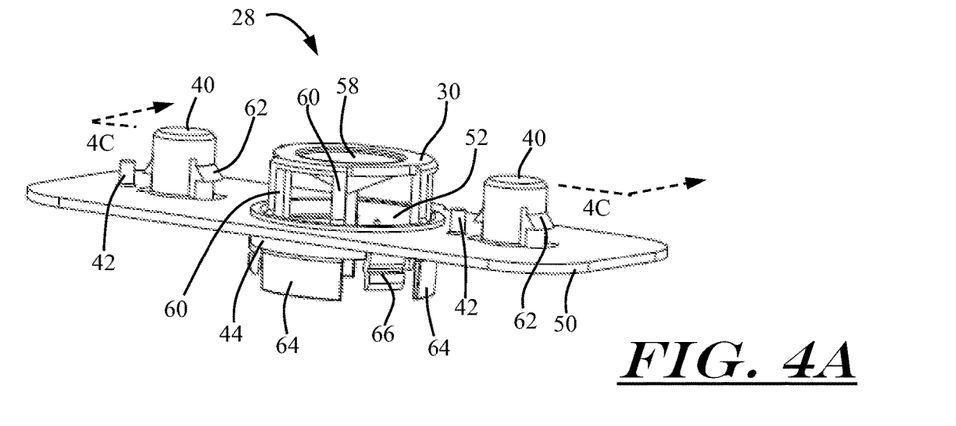
FIG. 4A is a perspective view of a connector according to the teachings herein for use with one or both of the climate control devices of FIGS. 2 and 3.
Figure 4B:
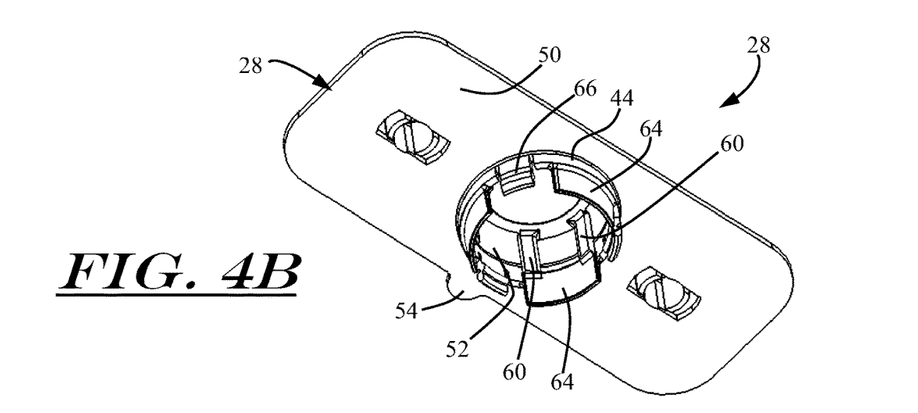
FIG. 4B is a perspective view of a connector according to the teachings herein for use with one or both of the climate control devices of FIGS. 2 and 3.
Figure 4C:
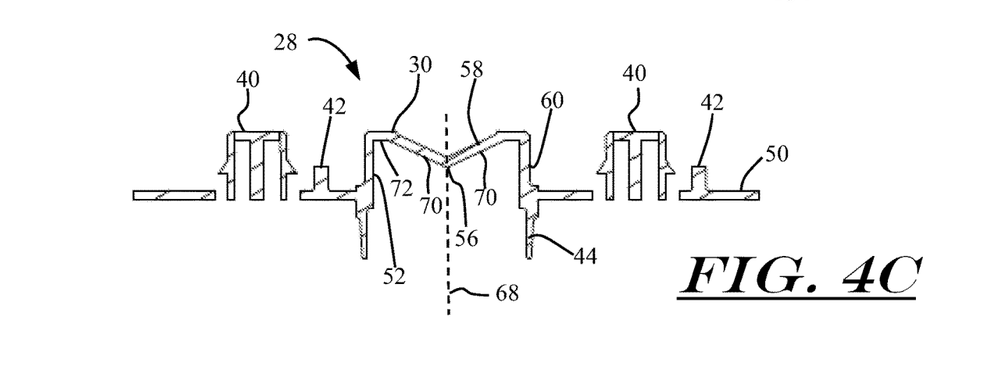
FIG. 4C is a cross-sectional view of the connector of FIGS. 4A and 4B taken along line 4C of FIG. 4A.

FIGS. 4A, 4B, and 4C further illustrate the connector 28. The connector 28 includes a base 50 and a passage 52. The upper flange 30, the bosses 40, and the alignment posts 42 extend from an upper surface of the base 50. The passage 52 extends through a thickness of the base 50. The base 50 includes a tab 54. The upper flange 30 includes a diverter 58 that is offset from the base 50 by supports 60. The diverter 58 extends towards the passage 52. The diverter 58 includes an area of impingement 70. The area of impingement 70 increases from an initial relatively small area at the tip 56 to a larger area away from the tip 56, such as at a surface 72 of the upper flange 30. Once the bosses 40 are received into the corresponding boss openings 36 in the spacer layer 18, one or more barbs 62 can engage the spacer layer 18. The lower flange 44 includes fingers 64 and locking fingers 66. The fingers 64, 66 cooperate to attach the opening 46 of the air mover 12 to the connector 28. The upper flange 30, a peak 56 of diverter 58, the passage 52, and the lower flange 44 are generally aligned along a longitudinal axis 68.

The climate control device 10 can be attached to any portion of the support device 110, such as the seating portion 112. In some instances, the weight of an occupant may cause the seating portion 112 to at least partially compress; however, the connector 28 may prevent the compressed seating portion 112 from blocking or restricting a flow of air between the air mover 12 and the spacer layer 18, the air distribution structure 14, or both. Moreover, the upper flange 30, the diverter 58, the area of impingement 70 and/or the supports 60 may distribute a flow of air supplied by the air mover 12 along the spacer layer 18, to the air distribution structure 14, or both.

Figure 5:
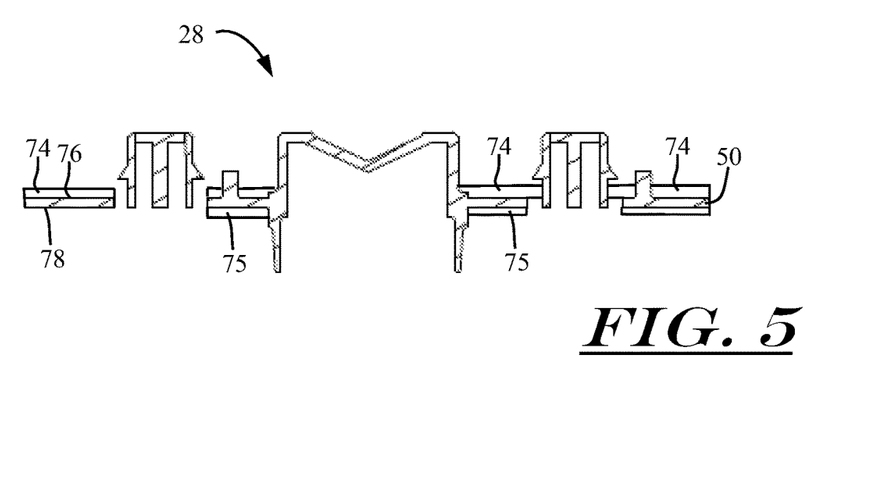
FIG. 5 is a cross-sectional view of the connector of FIGS. 4A and 4B taken along line 4C of FIG. 4A, but also including vibration isolators.

FIG. 5 illustrates a cross section of the connector 28. The connector 28 includes a base 50. The base 50 includes a first vibration isolator 74 located at least partially along an upper surface 76 of the base 50. The first vibration isolator 74 is located in a space between the upper surface 76 of the base 50 and the carrier 19 of the spacer layer 14, air distribution structure 14, or both (FIGS. 2 and 3). The base 50 includes a second vibration isolator 75 located at least partially along a lower surface 78 of the base 50. The second vibration isolator 75 is located in a space between the lower surface 78 of the base 50 and a housing 80 of the air mover 12 (FIG. 3). The connector 28 of FIG. 5 may include one or more of the features illustrated and described in the connector 28 FIGS. of 4A-4C.

Figure 6:
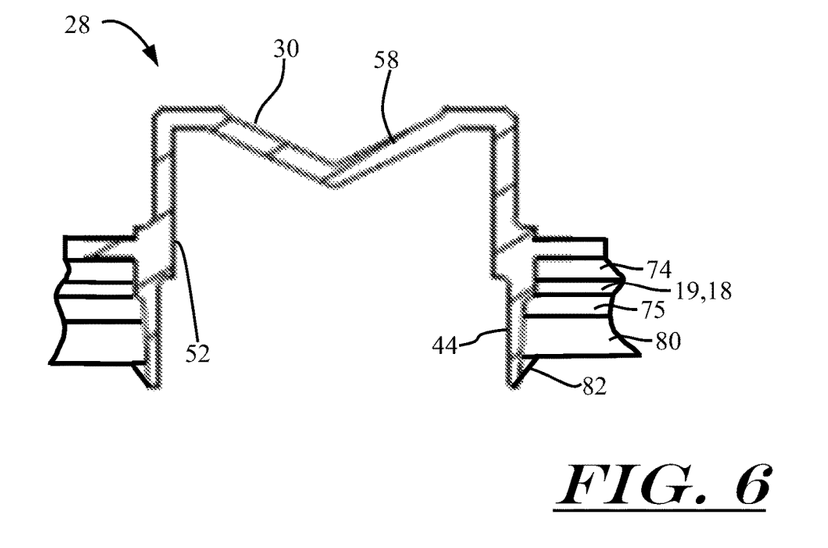
FIG. 6 is a cross-sectional view of a connector.

FIG. 6 illustrates a cross section of the connector 28 attached to the spacer layer 18. The connector 28 of FIG. 6 may include one or more of the features illustrated and described in the connector 28 FIGS. of 4A-5 (i.e., the upper flange 30, the lower flange 52, the diverter 58, etc.), except for the base 50. The connector 28 is attached to the spacer layer 18 such that the first vibration isolator 74 is sandwiched between the carrier 19 and the connector 28. The housing 80 of the air mover 12 (FIG. 3) is sandwiched between the second vibration isolator 75 and a clip 82 that extends from one of the fingers 44.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A connector, comprising:
   a base;
   a diverter that is spaced apart from an upper surface of the base via at least two supports, at least a portion of the diverter is configured to extend through an opening defined in a layer of a climate control device; and
   a passage defined in the base;
   wherein the diverter comprises a surface that is located above the passage,
   wherein the diverter is configured to deflect an air flow that is supplied through the passage,
   wherein the at least two supports are spaced apart from each other so that a gap is defined in between the at least two supports, and
   wherein the connector includes two alignment posts and two bosses, one of the alignment posts is located between one of the two bosses and the passage, and another of the alignment posts is located adjacent the other of the bosses.

2. The connector of claim 1, wherein the connector includes a lower flange that is configured to connect the connector to an air mover, the air mover is configured to supply the air flow through the passage.

3. The connector of claim 1, wherein the connector comprises a vibration isolator that is configured to dampen vibrations,
   wherein the vibration isolator is disposed:
      on the upper surface of the base and is configured to at least partially contact the layer of the climate control device, and/or
      on a lower surface of the base and is configured to contact a housing of an air mover.

4. A climate control system comprising the connector of claim 1, wherein the climate control system includes a cushion cooperating with the layer to form an air distribution structure,
   wherein the layer is a spacer layer,
   wherein the connector includes an upper flange that extends into an open space defined between the spacer layer and the cushion,
   wherein when the air distribution structure is at least partially collapsed, the upper flange, the diverter, or both are configured to prevent obstruction of the passage by the spacer layer, the cushion, or both, and
   wherein the cushion is part of a support device supporting an occupant.

5. The connector of claim 1, wherein the diverter comprises a vertex that extends in a direction towards the passage.

6. The connector of claim 1, wherein the diverter comprises a conically-shaped feature.

7. The connector of claim 1, wherein the connector includes one or more biasable fingers that are configured to connect the connector to an air mover.

8. The connector of claim 1, wherein the connector is configured to connect an air mover to an air distribution system located within a vehicle seat.

9. A climate control system comprising the connector of claim 1, wherein the climate control system includes a cover layer connected to the layer forming an air distribution structure,
   wherein the layer is a spacer layer,
   wherein the connector includes an upper flange that extends into an open space defined between the cover layer and the spacer layer, and
   wherein when the air distribution structure is at least partially collapsed, the upper flange, the diverter, or both are configured to prevent obstruction of the passage by the spacer layer, the cover layer, or both.

10. The climate control system of claim 9, wherein the cover layer includes a plurality of openings for distributing the air flow to a support device,
wherein the support device is a vehicle seat.

11. A connector, comprising:
a base;
a diverter;
a lower flange; and
a passage defined in the base,
wherein the lower flange comprises one or more biasable fingers that are configured to attach the connector to an air mover,
wherein the diverter comprises a conically-shaped surface that includes a vertex that points in a direction of the base towards the passage, and
wherein air from the air mover is configured to pass through the passage and then contact the diverter to deflect the air.

12. The connector of claim 11, wherein the connector comprises a vibration isolator on the base for dampening vibrations and/or for creating a desired clamping force between the connector and a spacer layer.

13. The connector of claim 11, wherein the diverter is offset from the base with at least two supports, the at least two supports are spaced apart from each other such that a gap is defined between the at least two supports-.

14. The connector of claim 11, wherein the connector is configured to connect the air mover to an air distribution system located within a vehicle seat.

15. A connector, comprising:
a base;
a diverter that is spaced apart from an upper surface of the base via at least two supports, at least a portion of the diverter is configured to extend through an opening defined in a layer of a climate control device; and
a passage defined in the base;
wherein the diverter comprises a surface that is located above the passage,
wherein the diverter is configured to deflect an air flow that is supplied through the passage, and
wherein the at least two supports are spaced apart from each other so that a gap is defined in between the at least two supports,
wherein the connector comprises a vibration isolator that is configured to dampen vibrations,
wherein the vibration isolator is disposed:
on the upper surface of the base and is configured to at least partially contact the layer of the climate control device, and/or
on a lower surface of the base and is configured to contact a housing of an air mover.

16. The connector of claim 15, wherein the connector includes one or more biasable fingers that are configured to connect the connector to the air mover.

17. The connector of claim 15, wherein the connector includes one or more bosses that are configured to connect the connector to a spacer layer, and/or the connector comprises one or more alignment posts that are configured to connect the connector to the spacer layer in a single orientation.

18. A climate control system comprising:
I) an air distribution structure comprising a cover layer and a spacer layer;
II) a connector, comprising:
a base;
a diverter that is spaced apart from an upper surface of the base via at least two supports, at least a portion of the diverter is configured to extend through an opening defined in the spacer layer; and
a passage defined in the base;
wherein the diverter comprises a surface that is located above the passage,
wherein the diverter is configured to deflect an air flow that is supplied through the passage,
wherein the at least two supports are spaced apart from each other so that a gap is defined in between the at least two supports,
wherein the connector includes an upper flange that extends into an open space defined between the cover layer and the spacer layer, and
wherein when the air distribution structure is at least partially collapsed, the upper flange, the diverter, or both are configured to prevent obstruction of the passage by the spacer layer, the cover layer, or both.

19. The connector of claim 18, wherein the connector includes one or more bosses that are configured to connect the connector to the spacer layer, and/or the connector comprises one or more alignment posts that are configured to connect the connector to the spacer layer in a single orientation.

20. The connector of claim 18, wherein the connector includes one or more biasable fingers that are configured to connect the connector to an air mover.

* * * * *